Figure 1:
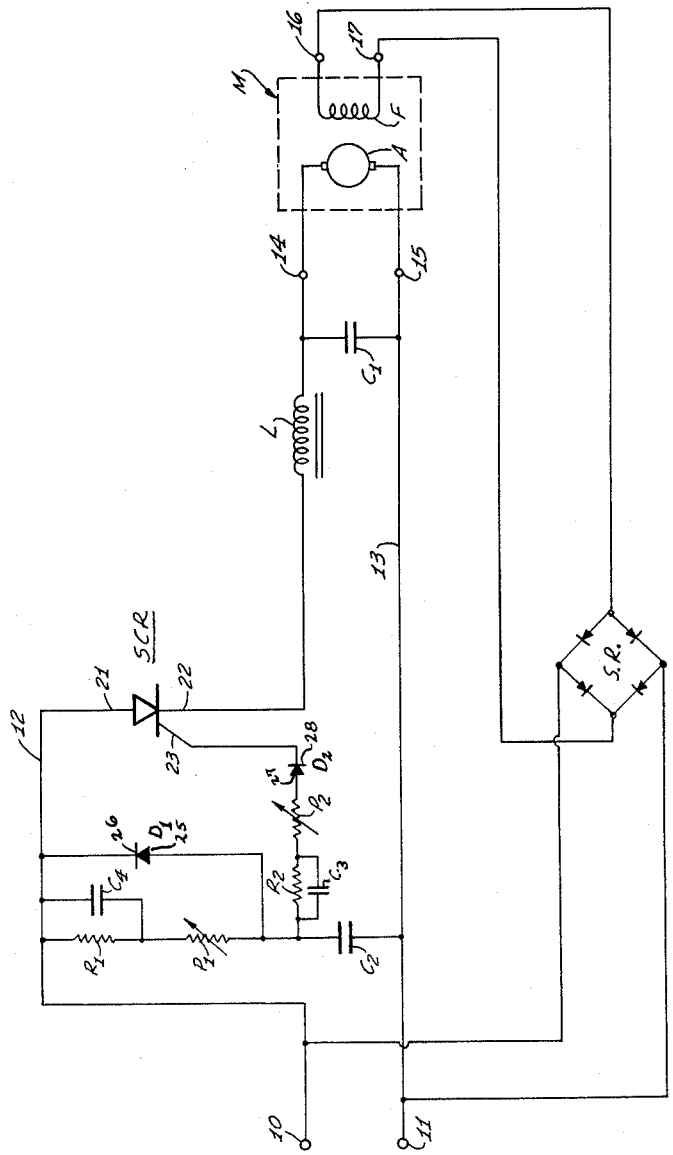

May 18, 1965 R. J. MASON ETAL 3,184,672
SCR POWER SUPPLY FOR MOTOR SPEED CONTROL SYSTEM
Filed Feb. 4, 1963 2 Sheets-Sheet 1

INVENTORS:
Raymond J. Mason
Richard C. Cowgill

By Gene W. Arant
Attorney

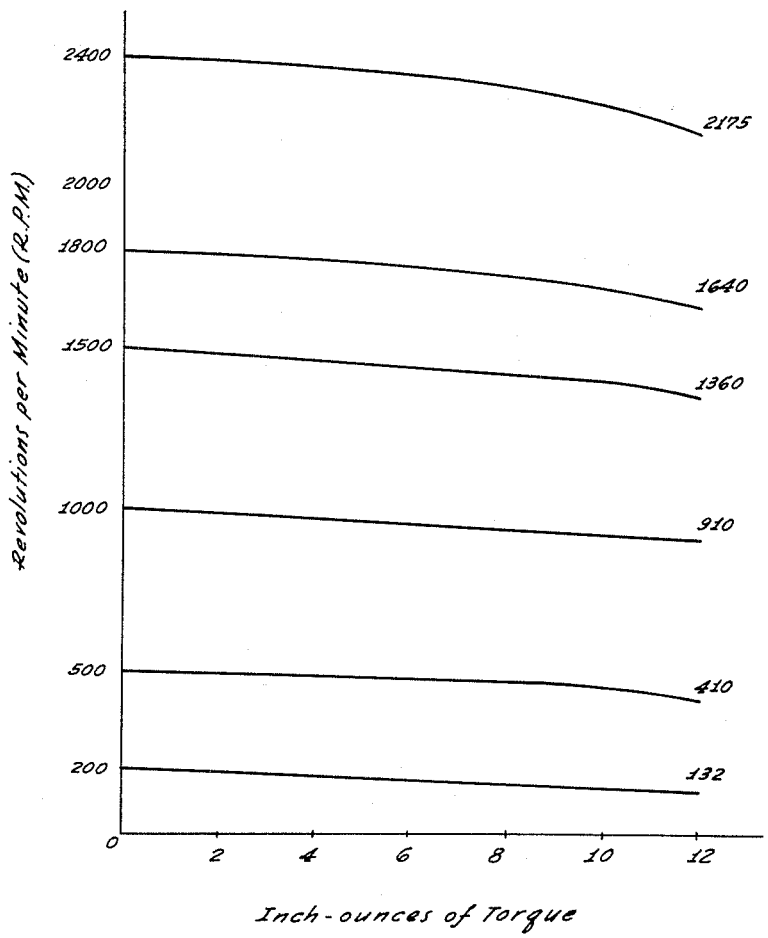

United States Patent Office 3,184,672
Patented May 18, 1965

3,184,672
SCR POWER SUPPLY FOR MOTOR SPEED CONTROL SYSTEM
Raymond J. Mason, Lynwood, and Richard C. Cowgill, San Gabriel, Calif., assignors to Minarik Electric Company, a corporation of California
Filed Feb. 4, 1963, Ser. No. 255,990
6 Claims. (Cl. 318—345)

The present invention relates to a regulated power supply circuit wherein a silicon-controlled rectifier is utilized as the current rectifying element.

The present invention is especially adapted for applications in which full-wave alternating energy is rectified for supplying a substantially constant voltage to the field winding of a shunt motor, while only half of the alternating voltage wave is rectified for supplying voltage to the motor armature. In its preferred form the invention provides for varying the armature voltage so as to select particular motor operating speeds which may be desired from time to time.

In the application of the present invention in its preferred form it is generally desired to be able to establish a selected operating speed of the motor, and to maintain the selected speed under varying load conditions. Thus the present invention is concerned with such questions as the cost of manufacturing the control circuits; the range of motor speeds which can be selected; the efficiency of regulation of the motor speed as a function of load changes. Maintaining motor speed as the load increases involves not only maintaining, but actually increasing, the voltage applied to the armature.

One object of the invention is to provide a regulated power supply of the foregoing type which utilizes a minimum number of components.

Another object of the invention is to provide a motor speed regulation circuit of the foregoing type which is capable of efficiently maintaining the motor speed despite variations in the mechanical load on the motor.

A further object of the invention is to provide a circuit of the foregoing type which is capable of selecting motor speeds over a wide range.

An additional object of the invention is to provide a circuit of the foregoing type which makes efficient provision for adjustment in the circuit constants in an assembly line factory operation, to compensate for parameter variations in the silicon-controlled rectifiers that are used.

The objects and advantages of the invention will be more fully apparent from the following description considered in conjunction with the accompanying drawings, in which:

FIGURE 1 is a schematic diagram of the electrical circuit of a presently preferred form of the invention; and FIGURE 2 is a graph illustrating the speed regulation characteristics of the circuit of FIGURE 1.

Referring now to FIGURE 1 of the drawings, a pair of input terminals 10 and 11 are adapted for connection to a standard source of alternating current, such as 115 volts. A direct current shunt motor whose operation is to be controlled is enclosed in a dotted box M, the motor armature being identified as A and the field winding as F. Terminals 14 and 15 are coupled to respective ends of the motor armature while terminals 16 and 17 are coupled to the respective ends of the field winding.

A full wave rectifier identified as S.R. is coupled to the input terminals 10, 11, and to the field winding terminals 16, 17, thereby providing a fully rectified and substantially constant voltage for the field winding which, however, does of course vary with the changes in supply line voltage. It will be understood that the field voltage is not directly affected by changes in mechanical load on the motor.

In the power supply circuit for the motor armature, a first circuit lead 13 is coupled between the input terminal 11 and motor armature terminal 15. A second circuit lead 12 is coupled to input terminal 10 and to the anode terminal 21 of a silicon-controlled rectifier identified as SCR. A choke coil L is coupled between the cathode terminal 22 of the SCR and motor armature terminal 14. A first capacitor $C_1$ is coupled between motor armature terminals 14 and 15.

The SCR is included in the circuit in such a polarity as to pass current to the motor armature during a portion of each positive half-cycle (as seen at input terminal 10) of the applied voltage wave, while capacitor $C_1$ provides a storage function for deriving energy through the SCR during positive half-cycles and providing energy to the motor armature during negative half-cycles. The SCR is selectively turned on by application of suitable voltage to its gate terminal 23 so as to permit it to conduct during less than the entire positive half-cycle. During the portion of the positive half-cycle when the SCR is not conducting energy is delivered from the capacitor $C_1$ to the motor armature. Choke coil L, coupled in series with the SCR and capacitor $C_1$, performs a necessary smoothing function.

The bias voltage for the gate terminal 23 of the SCR is derived as follows. A second capacitor $C_2$ has its lower terminal (as seen in the drawing) connected to the lead 13. A first diode $D_1$ has its anode 25 connected to the upper terminal of capacitor $C_2$ while its cathode 26 is connected to lead 12. A first potentiometer $P_1$ has one terminal connected to anode 25 of diode $D_1$, while a resistor $R_1$ is connected between the other terminal of $P_1$ and the circuit lead 12. A capacitor $C_4$ is coupled in parallel with resistor $R_1$. Bias voltage for the gate terminal is derived from the upper terminal of capacitor $C_2$.

During each positive half-cycle of the applied voltage wave current flowing through resistor $R_1$ and pitentiometer $P_1$ tends to build up a positive charge on the upper terminal of capacitor $C_2$. However, as soon as lead 12 drops below the potential of whatever charge capacitor $C_2$ may have acquired, the diode $D_1$ becomes forward-biased and commences to conduct, thus rapidly diminishing the positive charge on capacitor $C_2$, and then completely dissipating it as the voltage excursion enters the negative half-cycle of the applied wave. On each negative half-cycle of the applied voltage wave the capacitor $C_2$ is similarly charged in a negative direction, and it is this negative charge on capacitor $C_2$ which provides the ability to control the turning on of the SCR by rendering its gate terminal 23 sufficiently negative relative to its cathode terminal.

A diode $D_2$ is coupled between the upper terminal of capacitor $C_2$ and the gate terminal 23 of the SCR, and more specifically its anode terminal 27 is coupled to the upper terminal of capacitor $C_2$ while its cathode terminal 28 is coupled to gate terminal 23, so that it is able to conduct current from the capacitor $C_2$ to the gate terminal 23 of the SCR, but not in the inverse direction. As shown in the drawing it is also preferred to include in the circuit a resistor $R_2$ and a potentiometer $P_2$ which are coupled together in series with diode $D_2$. A capacitor $C_3$ is coupled in parallel with resistor $R_2$.

The operation of the circuit is as follows. At the commencement of each negative half-cycle of the applied voltage wave the previously existing positive potential on the upper terminal of capacitor $C_2$ is completely discharged, and during the negative half-cycle of the voltage wave the upper terminal of capacitor $C_2$ becomes charged to a negative potential which is substantially equal to the maximum negative value of the applied voltage, since the charging current by-passes the resistor $R_1$ and potentiometer $P_1$ and instead flows through diode $D_1$ whose forward conductance is rather nominal. As the applied voltage wave passes the negative peak the diode $D_1$ becomes back-biased, with the result that during the latter portion of the negative half-cycle the negative charge on capacitor $C_2$ leaks off at a time rate which is established by the values of resistor $R_1$ and potentiometer $P_1$. In this connection it should be noted that potentiometer $P_1$ is utilized to select the speed setting for the motor, with the maximum resistance value of $P_1$ corresponding to the slowest motor speed and the minimum value of $P_1$ corresponding to the fastest motor speed. As the applied voltage wave moves into its positive half-cycle the loss of negative charge from capacitor $C_2$ continues, and at some point in the positive half-cycle of the applied voltage wave the potential of gate terminal 23 becomes sufficiently high to permit the SCR to conduct.

At the conclusion of the positive half-cycle of the applied voltage wave the SCR becomes back-biased and ceases to conduct. It remains non-conductive during the negative half-cycle of the applied voltage wave and during the early portion of the next succeeding positive half-cycle, with the point at which conduction commences being primarily determined by the bias control circuit, as described above.

The turn-on point of the SCR is in part governed by the potential of its cathode terminal 22, which in turn is in part governed by the amount of energy stored in the capacitor $C_1$. Specifically, during the negative half-cycle an increased mechanical load on the motor causes slower motor speed, less back E.M.F. generated by the armature, more energy drain from capacitor $C_1$, and an earlier turn-on point for the SCR during the next succeeding positive half-cycle.

Capacitor $C_4$ in parallel with $R_1$ increases the voltage gain, or speed regulation efficiency, at high motor speeds. At low speeds where potentiometer $P_1$ is set near its maximum value the capacitor $C_4$ has little effect, but at high speeds the circuit resistance is provided primarily or exclusively by $R_1$ with which $C_4$ is in parallel.

Resistor $R_2$ and capacitor $C_3$ provide good regulation at low motor speeds. Potentiometer $P_2$ is adjusted at the factory to compensate for, or to be compatible with, the gate current flow of the particular SCR installed in that circuit.

A set of component values successfully used are:

Motor—Bodine 1/50 H.P.
L—300 turns on 1/2″ square rectangular iron core
SCR—3 TCRE
$C_1$—30 µfd.
$C_2$—1 µfd.
$C_3$—5 µfd.
$C_4$—2 µfd.
$D_1$, $D_2$—1 N 2070
$R_1$—1500 ohms, 1 watt
$R_2$— 22 K, 1/2 watt
$P_1$—7.5 K, 5 watt
$P_2$—5 K, 5 watt Referring now to FIGURE 2, the performance of the circuit of FIGURE 1 utilizing the component values listed in the immediately preceding paragraph is there illustrated. The alternating supply voltage was held constant throughout the test run from which the curves of FIGURE 2 were derived.

It may actually be preferred to utilize larger capacitance values of 40 µµf. for $C_1$, and 5 µµf. for $C_4$, in order to further improve the regulation at high speeds. In that event, with an initial speed setting of 2400 r.p.m. at no load, the no load armature voltage is approximately 112 volts, while at maximum load with some speed reduction the armature voltage rises to approximately 130 volts.

It should be understood that the coil L can be connected on either end of capacitor $C_1$. While the input capacitance of the motor armature is believed to be of some significance in the circuit operation, it is nevertheless possible to utilize the regulated power supply circuit for a purely resistive load connected to the output terminals 14, 15.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A regulated power supply for a direct current shunt motor comprising, in combination:
    separate full-wave rectifier means adapted to be coupled to an alternating voltage source and to the field winding of the shunt motor for providing energy thereto during both positive and negative half-cycles of the applied alternating voltage wave;
    a silicon-controlled rectifier having anode, cathode, and gate terminals;
    a filter circuit including an inductance coil and a capacitor coupled together in series;
    bilaterally conductive circuit means coupling one end of said filter circuit to said cathode of said silicon-controlled rectifier;
    circuit means adapted for coupling the other end of said filter circuit, and said anode terminal of said silicon-controlled rectifier, across the alternating voltage source;
    circuit means for coupling the motor armature in parallel across said capacitor;
    and bias control means coupled to said gate terminal of said silicon-controlled rectifier and adapted to be coupled across the alternating voltage source;
    the circuit action being such that driving energy is supplied to the motor armature during both the positive and the neagtive half-cycles of the applied alternating voltage wave, and during each negative half-cycle the mechanical load on the motor determines the amount of energy drawn from said capacitor into the motor armature and thereby changes the potential level at said cathode terminal of said silicon-controlled rectifier so as to precisely determine the point at which said silicon-controlled rectifier becomes conductive during the next succeeding half-cycle of the applied voltage wave.

2. A combined power supply and speed control circuit for supplying power to a direct-current shunt motor, selecting a desired operating speed of the motor, and maintaining the selected speed under varying load conditions, said circuit comprising, in combination:
    a pair of input terminals for receiving an alternating voltage from a power source;
    a full-wave rectifier circuit coupled to said input terminals and adapted to supply a direct voltage of substantially constant value to the motor field;
    a silicon-controlled rectifier having anode, cathode and gate terminals;
    circuit means coupling one of said input terminals to said anode terminal;
    a choke coil and a first capacitor coupled in series between said cathode terminal and the other of said input terminals;
    circuit means adapted for coupling the motor armature in parallel with said first capacitor;
    a second capacitor having one terminal thereof coupled to said other input terminal;
    first impedance means coupled between said one input terminal and the other terminal of said second capacitor;
    a first diode having its cathode coupled to said one input terminal and its anode coupled to said other terminal of said second capacitor;

and a second diode having its anode coupled to said other terminal of said second capacitor and its cathode coupled to said gate terminal;

said first impedance means being variable for selecting the desired motor speed.

3. A regulated power supply comprising, in combination:

first and second input terminals adapted to receive an alternating voltage;

a silicon-controlled rectifier having anode, cathode, and gate terminals, said anode terminal being conductively coupled to said first input terminal;

an inductance coil and a first capacitor coupled together in series between said cathode terminal and said second input terminal, the two ends of said first capacitor providing a pair of output terminals;

a second capacitor having one end thereof coupled to said second input terminal;

resistance means coupled between said first input terminal and the other end of said second capacitor;

a first diode having its anode coupled to said other end of said second capacitor and its cathode coupled to said first input terminal;

and a second diode having its anode coupled to said anode of said first diode and its cathode coupled to said gate terminal;

said first capacitor having a capacitance value at least several times greater than said second capacitor.

4. A motor power supply as claimed in claim 1 wherein said bias control means includes first impedance means and a second capacitor coupled in series with each other across said alternating voltage source, a first diode shunting said first impedance means, and second resistance means and a second diode coupled in series between said second capacitor and said gate terminal, said first and second diodes providing alternate paths for conducting current away from said second capacitor; said first capacitor having a capacitance value at least several times greater than said second capacitor.

5. A circuit as in claim 4 wherein said first impedance means includes a capacitor and a fixed resistor coupled in parallel, and a variable resistor coupled in series therewith.

6. A circuit as in claim 4 wherein said second impedance means includes a capacitor and a fixed resistor coupled in parallel, and a variable resistor coupled in series therewith.

References Cited by the Examiner

UNITED STATES PATENTS 2,981,880    4/61    Momberg et al. _____ 318—345 X
3,103,618    9/63    Slater _____ 323—22

OTHER REFERENCES

Applied Electronics, The Technology Press, Massachusetts Institute of Technology, 1943, page 289.

GE Application Note 200.4, June 1961, page 5.

F. W. Gutzwiller, Universal Motor Speed Controls.

ORIS L. RADER, *Primary Examiner.*